A. DUNBAR.
HORSESHOE.
No. 170,245. Patented Nov. 23, 1875.
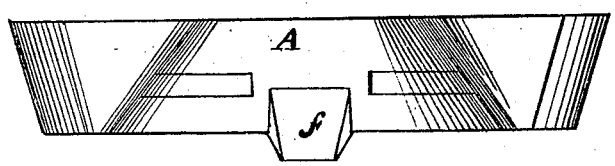
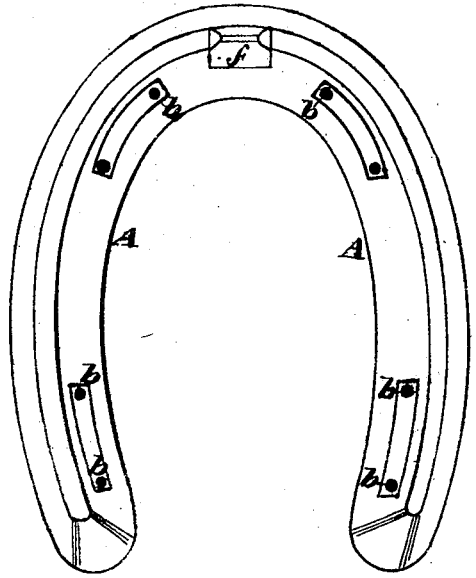
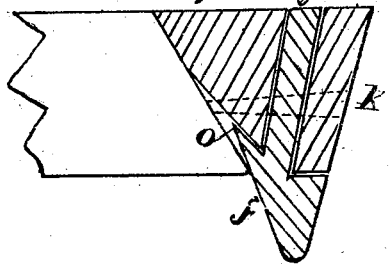
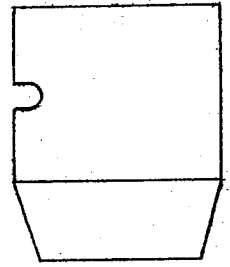
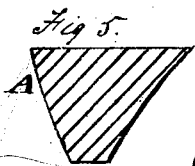
Witnesses
Geo. H. Strong
Jno. L. Boone
Inventor
Alexander Dunbar
by Dewey & Co
Attys

UNITED STATES PATENT OFFICE.

ALEXANDER DUNBAR, OF BEECHVILLE, CANADA.

IMPROVEMENT IN HORSESHOES.

Specification forming part of Letters Patent No. 170,245, dated November 23, 1875; application filed June 22, 1875.

CASE B.

*To all whom it may concern:*

Be it known that I, ALEXANDER DUNBAR, of Beechville, Province of Ontario, Dominion of Canada, have invented an Improved Horseshoe; and I do hereby declare the following description and accompanying drawings are sufficient to enable any person skilled in the art or science to which it most nearly appertains to make and use my said invention or improvement without further invention or experiment.

My invention relates to an improved horseshoe, which is intended more especially for pathological purposes, but which can also be used for ordinary wear.

Referring to the accompanying drawings, Figure 1 is a front view. Fig. 2 is a plan view, and Figs. 3, 4, and 5 are detail views.

A is a horseshoe, which is bent in the ordinary manner to the ordinary shape of horseshoes. Instead of constructing the shoe with a straight or vertical outside edge or rim, I bevel it inward, as shown, so as to bring the bearing more directly under the inner edge of the wall of the hoof.

When the outer rim is made straight, as in the ordinary manner of constructing horseshoes, the bearing is thrown to the outer edge of the shoe, and along the outer edge of the hoof; consequently the foot of the horse is under an unnatural strain when he is standing or walking, and creates the disease called "laminitis;" but by transferring the bearing to the inside edge of the wall of the hoof, where it connects with the sole, the weight will be supported more directly under the foot, thus avoiding the strain above mentioned. This arrangement also has a great tendency to prevent interfering or striking of the knees.

To secure the shoe to the foot of the horse, I make the nail-holes *b b* on each side of the toe, and on each side of the heel, leaving that portion between the toe and heel perfectly free.

My reasons for thus nailing the shoe are, first, that the hoof is thickest and strongest at toe and heel, so that the fastenings are more secure with less injury to the hoof; and, secondly, I leave the middle portions or sides of the hoof free to expand, and thus prevent cramping the foot. This manner of nailing also permits me to spread the hoof to better advantage with my hoof-spreader, a device for which I have made application for a patent separate from this. The nails are thus driven into the hoof both in front and behind the wings of the coffin-bone, a bone which is frequently crowded by the non-expansion of the hoof on the sides of the foot, so as to produce ossification of the bone and soreness of the surrounding parts, which is the sole cause of "letting down" in the race-horse, and of the short spasmodic stepping of the work-horse.

I also provide a detachable toe and heel calk for horseshoes, which I construct and apply in the following manner: The calk *f* is made with a tenon, *i*, and this tenon passes into a mortise in the shoe at the point at which it is to be attached. A shoulder, *o*, is formed on the calk at the base of the tenon, and this shoulder stands at an angle so as to fit the angular inside edge of the shoe, while the opposite side has a square shoulder, which fits upon the outer portion of the shoe. When the tenon is fitted into the mortise, I key it by means of a pin, *k*, which passes transversely through the mortise and tenon, as represented.

I thus provide a detachable calk which can be applied when desired. I thus provide a horseshoe which is greatly superior to the ordinary shoe, and which is of especial value in the treatment of the feet of horses.

Having thus described my invention, what I claim, and desire to secure by Letters Patent, is—

The improvement in horse-shoeing, the same consisting in nailing the shoe to the hoof on each side of the toe and at the heel, so as to leave the sides of the hoof free to expand, substantially as specified.

In witness whereof I hereunto set my hand and seal.

ALEXANDER DUNBAR. [L. S.]

Witnesses:
GEO. H. STRONG,
J. L. BOONE.